US010693606B2

(12) United States Patent
Cha et al.

(10) Patent No.: US 10,693,606 B2
(45) Date of Patent: Jun. 23, 2020

(54) METHOD FOR DETERMINING INITIALIZATION VALUE OF SEQUENCE IN WIRELESS COMMUNICATION SYSTEM AND APPARATUS THEREFOR

(71) Applicant: LG ELECTRONICS INC., Seoul (KR)

(72) Inventors: Hyunsu Cha, Seoul (KR); Kijun Kim, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/176,159

(22) Filed: Oct. 31, 2018

(65) Prior Publication Data

US 2019/0215113 A1  Jul. 11, 2019

Related U.S. Application Data

(60) Provisional application No. 62/590,503, filed on Nov. 24, 2017, provisional application No. 62/588,302, filed on Nov. 17, 2017, provisional application No. 62/579,148, filed on Oct. 31, 2017.

(51) Int. Cl.
| | | |
|---|---|---|
| *H04L 5/00* | (2006.01) | |
| *H04W 72/08* | (2009.01) | |
| *H04J 13/16* | (2011.01) | |
| *H04L 27/26* | (2006.01) | |
| *H04J 13/00* | (2011.01) | |

(52) U.S. Cl.
CPC ............ *H04L 5/0026* (2013.01); *H04J 13/00* (2013.01); *H04J 13/16* (2013.01); *H04L 5/00* (2013.01); *H04L 5/0051* (2013.01); *H04L 27/26* (2013.01); *H04W 72/085* (2013.01)

(58) Field of Classification Search
None
See application file for complete search history.

(56) References Cited

U.S. PATENT DOCUMENTS

| | | | | |
|---|---|---|---|---|
| 2011/0274193 A1* | 11/2011 | Yoon | ........................ | H04J 13/10 375/260 |
| 2012/0281554 A1* | 11/2012 | Gao | ....................... | H04W 48/12 370/252 |
| 2019/0116076 A1* | 4/2019 | Li | ............................ | H04J 13/10 |

FOREIGN PATENT DOCUMENTS

WO    WO2016182591    11/2016

OTHER PUBLICATIONS

Zte et al., R1-1715448, On CSI-RS for CSI acquisition and beam management, 3GPP TSG RAN WG1 #AH, Sep. 12, 2017 See section 1 and 2 (including sub-sections). (Year: 2017).*
3GPP TS 36.211 V14.0.0, Sep. 29, 2016 See section 6.10 and its sub-sections. (Year: 2016).*

(Continued)

*Primary Examiner* — Alex Skripnikov
(74) *Attorney, Agent, or Firm* — Fish & Richardson P.C.

(57) ABSTRACT

Provided is a method of determining an initialization value of a sequence in a wireless communication system. Specifically, a method performed by evolveda base station includes generating a first sequence of a channel state information-reference signal (CSI-RS) based on a pseudo-random sequence; and transmitting the first sequence on resource element (RE)s.

15 Claims, 10 Drawing Sheets

(56) References Cited

OTHER PUBLICATIONS

Zte, "On CSI-RS for CSI acquisition and beam management," R1-1715448, 3GPP TSG RAN WG1 Meeting NR#3, Nagoya, Japan, dated Sep. 12, 2017, 11 pages.
Huawei, "CSI-RS design in NR," R1-1712248, 3GPP TSG RAN WG1 Meeting #90, Prague, Czech, dated Aug. 12, 2017, 8 pages.
Samsung, "Wider Bandwidth Operations," R1-1710761, 3GPP TSG RAN WG1 Meeting NR#2, Qingdao, P.R. China, dated Jun. 16, 2017, 10 pages.
Intel Corporation, "NR PBCH Design," R1-1712526, 3GPP TSG RAN WG1 Meeting #90, Prague, Czech, dated Aug. 12, 2017, 12 pages.

* cited by examiner

METHOD FOR DETERMINING INITIALIZATION VALUE OF SEQUENCE IN WIRELESS COMMUNICATION SYSTEM AND APPARATUS THEREFOR

CROSS-REFERENCE TO RELATED APPLICATIONS

This application claims the benefit of U.S. Provisional Application No. 62/579,148 filed on Oct. 31, 2017, U.S. Provisional Application No. 62/588,302 filed on Nov. 17, 2017 and U.S. Provisional Application No. 62/590,503 filed on Nov. 24, 2017. The contents of this application are hereby incorporated by reference in its entirety.

BACKGROUND OF THE INVENTION

Field of the Invention

This specification relates to a wireless communication system and, more particularly, to method of determining an initialization value related to the sequence of a channel state information-reference signal (CSI-RS) and an apparatus supporting the same.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

This specification provides a method of configuring an initialization value of an RS sequence in a new radio (NW) system.

Furthermore, this specification provides a method of applying the same or different sequences to ports within a CDM group or between CDM groups.

Technical objects to be achieved in the present invention are not limited to the aforementioned technical objects, and other technical objects not described above may be evidently understood by a person having ordinary skill in the art to which the present invention pertains from the following description.

In an aspect, a method of determining, by a base station, an initialization value of a sequence in a wireless communication system, the method comprising: generating a first sequence of a channel state information-reference signal (CSI-RS) based on a pseudo-random sequence; and transmitting the first sequence on resource element (RE)s, wherein an initialization value of the pseudo-random sequence is determined based on a value obtained by performing modulo operation of $2^N$ on a third factor, the third factor determined based on a product of the first factor and the second factor, wherein the first factor is (the number of OFDM symbols within a slot×a slot index+an OFDM index within a slot+1), and wherein the second factor is (2×scrambling ID+1).

Furthermore, in this specification, the third factor is ($2^M$×(the first factor)×(the second factor)+scrambling ID), the N is a natural number greater than or equal to 31, and the M is an integer smaller than N.

Furthermore, in this specification, the N is 31, and the M is 10.

Furthermore, in this specification, the number of OFDM symbols within the slot is 14.

Furthermore, in this specification, the scrambling ID is $2^M-1$ from 0.

Furthermore, in this specification, the initialization value of the pseudo-random sequence has a different value for each OFDM symbol within a radio frame.

Furthermore, in this specification, the resource element (RE)s include at least one of a time, a frequency or an antenna port.

Furthermore, this specification provides a base tation for determining an initialization value of a sequence in a wireless communication system, the eNB comprising: a radio frequency (RF) module for transmitting and receiving radio signals; and a processor functionally connected to the RF module, wherein the processor is configured to: generate a first sequence of a channel state information-reference signal (CSI-RS) based on a pseudo-random sequence; and transmit the first sequence on resource element (RE)s, wherein an initialization value of the pseudo-random sequence is determined based on a value obtained by performing modulo operation of $2^N$ on a third factor, the third factor determined based on a product of the first factor and the second factor, wherein the first factor is (the number of OFDM symbols within a slot×a slot index+an OFDM index within a slot+1), and wherein the second factor is (2×scrambling ID+1.

Furthermore, this specification provides a user equipment (UE) for receiving a channel state information-reference signal (CSI-RS) in a wireless communication system, the UE comprising: a radio frequency (RF) module for transmitting and receiving radio signals; and a processor functionally connected to the RF module, wherein the processor is configured to: receive the CSI-RS from a base station; perform a measurement based on the CSI-RS; and report information for measurement to the base station, wherein a first sequence of the CSI-RS is generated based on a pseudo-random sequence, wherein an initialization value of the pseudo-random sequence is determined based on a value obtained by performing modulo operation of $2^N$ on a third factor, the third factor determined based on a product of a first factor and a second factor, wherein the first factor is (a number of OFDM symbols within a slot×a slot index+an OFDM index within a slot+1), and wherein the second factor is (2×scrambling ID+1).

BRIEF DESCRIPTION OF THE DRAWINGS

The accompanying drawings included as part of the detailed description in order to help understanding of the present invention provide embodiments of the present invention, and describe the technical characteristics of the present invention along with the detailed description.

DESCRIPTION OF EXEMPLARY EMBODIMENTS

Figure 1:
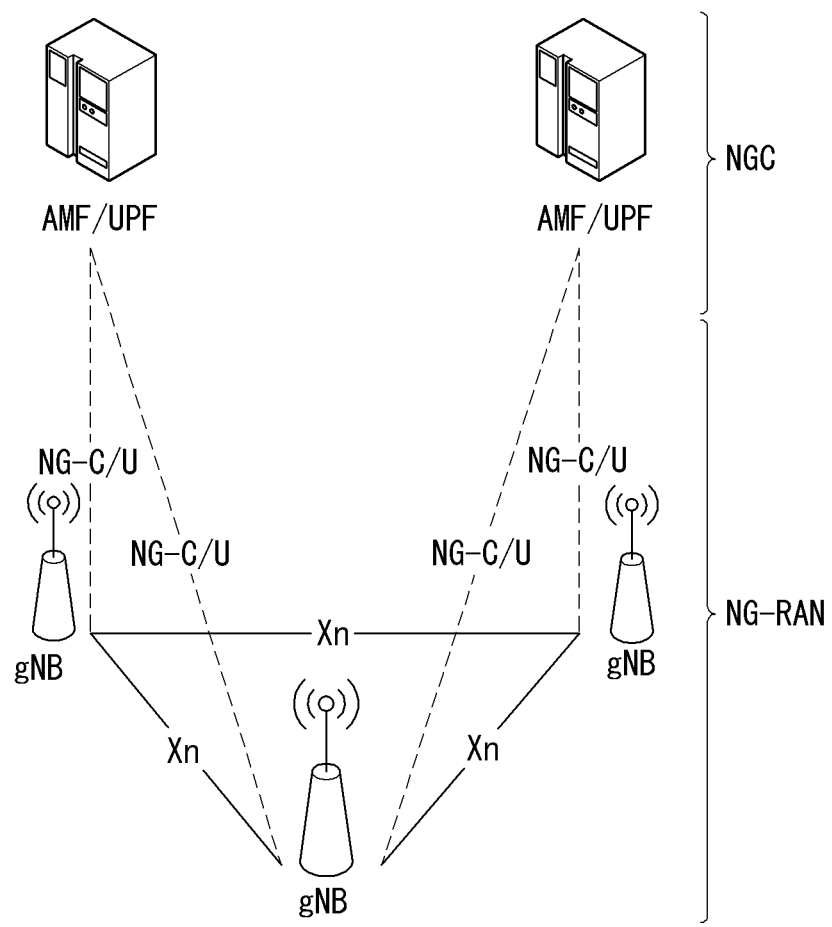
FIG. 1 is a diagram showing an example of a general system structure of NR to which a method proposed in this specification may be applied.

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Also, 5G NR (new radio) defines an enhanced mobile broadband (eMBB), a massive machine type communication (mMTC), a ultra-reliable low latency communication (URLLC), and a vehicle-to-everything (V2X).

The 5G NR standard distinguishes between a standalone (SA) and a non-standalone (NSA) depending on the co-existence between the NR system and the LTE system.

The 5G NR supports various subcarrier spacing, cyclic prefix (CP)-OFDM in the downlink, CP-OFDM and DFT-s-OFDM (SC-OFDM) in the uplink.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A/NR is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the Nr system may be defined as in Table 1.

TABLE 1

| $\mu$ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

Figure 2:
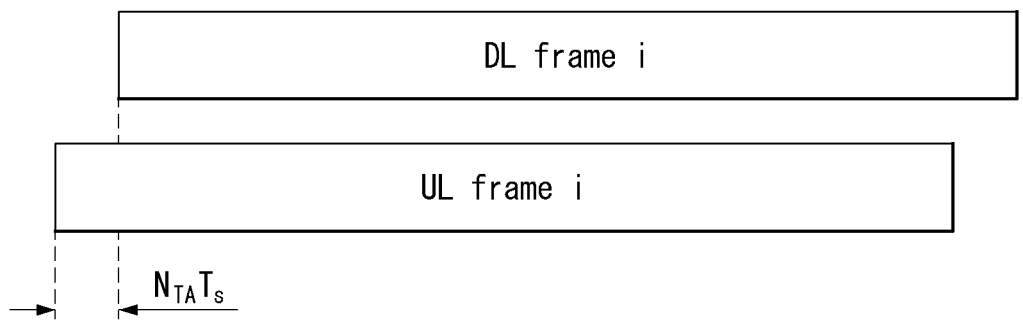
FIG. 2 shows the relation between an uplink frame and a downlink frame in a wireless communication system to which a method proposed in this specification may be applied.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| $\mu$ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

Figure 3:
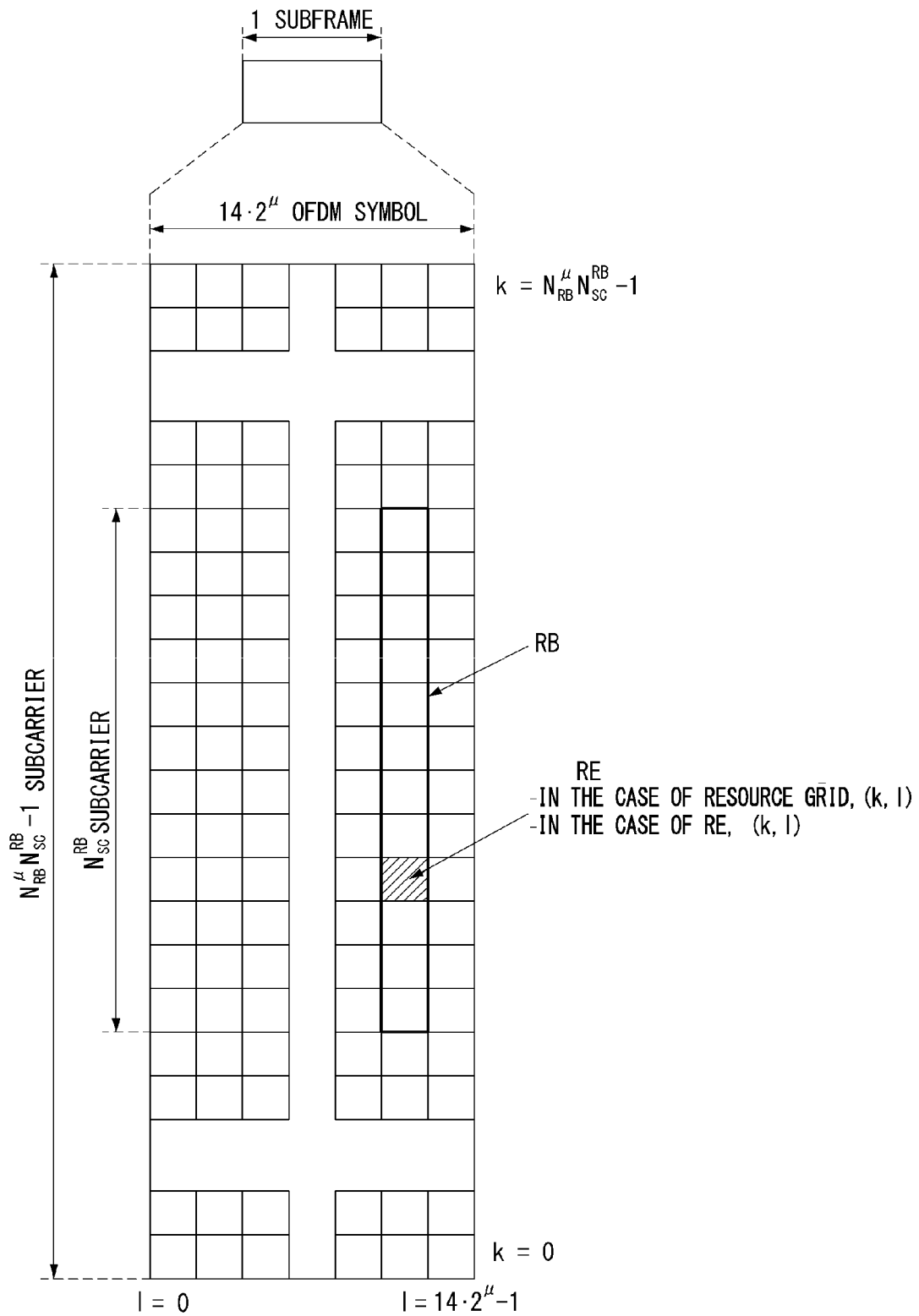
FIG. 3 shows an example of a resource grid supported in a wireless communication system to which a method proposed in this specification may be applied.

FIG. 3 illustrates an example of a resource grid supported in a wireless communication system to which a method proposed by the present disclosure may be implemented.

Referring to FIG. 3, a resource grid is composed of $N_{RB}^{\mu} N_{sc}^{RB}$ subcarriers in a frequency domain, each subframe composed of $14 \cdot 2\mu$ OFDM symbols, but the present disclosure is not limited thereto.

In the NR system, a transmitted signal is described by one or more resource grids, composed of $N_{RB}^{\mu} N_{sc}^{RB}$ subcarriers, and $2^{\mu} N_{symb}^{(\mu)}$ OFDM symbols. Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology $\mu$ and an antenna port p.

Each element of the resource grid for the numerology $\mu$ and the antenna port p is indicated as a resource element, and may be uniquely identified by an index pair (k, $\bar{l}$). Herein, $k=0, \ldots, N_{RB}^{\mu} N_{sc}^{RB}-1$ is an index in the frequency domain, and $\bar{l}=0, \ldots, 2^{\mu} N_{symb}^{(\mu)}-1$ indicates a location of a symbol in a subframe. To indicate a resource element in a slot, the index pair (k, $\bar{l}$) is used. Herein, $l=0, \ldots, N_{symb}^{\mu}-1$.

The resource element (k,$\bar{l}$) for the numerology $\mu$ and the antenna port p corresponds to a complex value $a_{k,\bar{l}}^{(p,\mu)}$. When there is no risk of confusion or when a specific antenna port or numerology is specified, the indexes p and $\mu$ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

First, the existing methods for the sequence initialization of a reference signal (RS) are described in brief, and a method of initializing an RS sequence (in new radio (NR)) proposed in this specification is described in detail.

The number of bits necessary to express an initial seed $c_{init}$ is 34 bits by taking into consideration the number of scrambling identities (or scrambling IDs) supported by NR and the number of orthogonal frequency division multiplexing (OFDM) symbols.

The number of scrambling identities may be the same as the number of physical cell identities.

Furthermore, the number of scrambling identities cannot be satisfied using the existing (LTE) length-31 Gold sequence related to Equation 2.

Accordingly, a new PN sequence based on a length-63 Gold sequence needs to be designed for NR.

$$c_{init} = 2^{11} \cdot \underbrace{(14 \cdot (n_s+1) + l + 1) \cdot (2 \cdot n_{ID}^{(n_{SCID})} + 1)}_{23 \text{ bits}} + \underbrace{2 \cdot n_{ID}^{(n_{SCID})}}_{10 \text{ bits}} + \underbrace{n_{SCID}}_{1 \text{ bit}} \quad \text{[Equation 2]}$$

In Equation 2, c(i) indicates a pseudo-random sequence, $n_s$ indicates a slot number within a radio frame, l is an OFDM symbol number within a slot, and nSCID indicates a scrambling ID.

In another method for RS sequence initialization, c(i) may be initialized by Equation 3.

$$c_{init} = 2^{10} \cdot f(l+14 \cdot n_s) \bmod N, n_{ID}, n_{RStype}) + n_{ID} \quad \text{[Equation 3]}$$

In Equation 3, the functions f ( . . . ) and N are selected using a maximum of 21 bits.

In this case, $n_s$ is a slot number within a radio frame and starts at $n_s=0$. l is a symbol index within a slot (l=0, 1, . . . , 13).

Furthermore, $n_{ID}$ is a number between 0 and 1007 selected from a set independently configured by a higher layer with respect to DL and UL and (additionally) a set based on scheduling DCI.

The value $n_{ID}$ may be the same as a cell ID ($N_{ID}^{cell}$) if the value is not set by a higher layer.

Furthermore, $n_{RStype}$ indicates a number associated with an RS type.

Another $c_{init}$ for c(i) is the same as Equation 4.

$$c_{init}=2^{11} \cdot (14 \cdot (n'_s+1)+l+1) \cdot (2 \cdot N_{ID}^{CSI}+1)+2 \cdot N_{ID}^{CSI}+N_{CP}, \text{ where } n'_s=\text{mod}(n_s,20) \quad \text{[Equation 4]}$$

In Equation 4, $N_{CP}$ is 1 in the case of a normal CP and is 0 in the case of an extended CP.

An RS sequence defined in the LTE system is described below.

A reference signal sequence $r_{l,n_s}^{(m)}$ is defined by Equation 5.

$$r_{l,n_s}(m) = \frac{1}{\sqrt{2}}(1-2 \cdot c(2m)) + j\frac{1}{\sqrt{2}}(1-2 \cdot c(2m+1)), \quad \text{[Equation 5]}$$
$$m = 0, 1, \ldots, N_{RB}^{max,DL} - 1$$

In Equation 5, $n_s$ is a slot number within a radio frame, and l is an OFDM symbol number within a slot.

A pseudo-random sequence c(i) is defined by Equation 7.

Furthermore, a pseudo-random sequence generator is initialized as $c_{init}=2^{10} \cdot (7 \cdot (n'_s+1)+l+1) \cdot (2 \cdot N_{ID}^{CSI}+1)+2 \cdot N_{ID}^{CSI}+N_{CP}$ as the start of each OFDM symbol in a slot that satisfies Equation 6.

$$n'_s = \begin{cases} 10\lfloor n_s/10 \rfloor + n_s \bmod 2 & \text{for frame structure type} \\ & \text{3 when the } CSI\text{-}RS \\ & \text{is part of a } DRS \\ n_s & \text{otherwise} \end{cases} \quad \text{[Equation 6]}$$

$$N_{CP} = \begin{cases} 1 & \text{for normal } CP \\ 0 & \text{for extended } CP \end{cases}$$

In this case, quantity $N_{ID}^{CSI}$ is the same as $N_{ID}^{cell}$ if it is not configured by a higher layer.

Furthermore, the aforementioned pseudo-random sequences are defined by the length-31 gold sequence, and the output sequence c(n) of the length $M_{PN}$ is defined by Equation 7.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2 \quad \text{[Equation 7]}$$

In this case, n=0, 1, ..., $M_{PN}-1$, $N_C=1600$, and the first m-sequence (x1(n)) is initialized as $x_1(0)=1$, $x_1(n)=0$, n=1, 2, ..., 30.

The second m-sequence is expressed as $c_{init}=\Sigma_{i=0}^{30} x_2(i) \cdot 2^i$ having a value dependent on the application of the corresponding sequence.

As in the case where a physical resource block (PRB) of the LTE system includes 14 OFDM symbols, one slot includes 14 OFDM symbols in the NR numerology.

However, one (radio) frame may include 10 to 320 slots because the NR system supports various subcarrier spacings (SCS) (15 kHz~480 kHz).

Hereinafter, a method of effectively configuring a sequence initialization value of a reference signal (RS) using a limited number of bits, which is proposed in this specification, is described.

The reference signal (RS) may be a channel state information-reference signal (CSI-RS), a demodulation RS (DMRS), a time and frequency tracking RS (TRS), a phase tracking RS (PTRS) and so on.

A sequence initialization value may be the same as Equation 8 by taking into consideration NR system numerology in which one slot includes 14 OFDM symbols and 1008 cell identifiers (IDs) based on the CSI-RS sequence initialization method of the LTE system.

$$c_{init}=2^{11} \times (14(n_s+1)+l+1)(2N_{ID}+1)+2N_{ID}+N_{CP} \quad \text{[Equation 8]}$$

In Equation 8, the definition of the parameters included in Equation 8 and the range of each parameter value are as follows.

(1) $N_{ID} \in \{0, 1, 2, \ldots, 1007\}$: a parameter indicative of an RS ID or a temporary UE ID, and has the same value as a cell ID if it is not configured in an eNB.

Furthermore, $N_{ID}$ means a scrambling ID configured in a UE-specific manner.

The ID used in this specification may be expressed as an identity, identifier or identification.

(2) $l \in \{0, 1, \ldots, 13\}$: a parameter indicative of an OFDM symbol index within a slot.

(3) $n_s$: a parameter indicative of a slot index of an NR system and has the following range depending on subcarrier numerology of a supported system.

- −15 kHz: $n_s \in \{0, 1, \ldots, 9\}$
- −30 kHz: $n_s \in \{0, 1, \ldots, 19\}$
- −60 kHz: $n_s \in \{0, 1, \ldots, 39\}$
- −120 kHz: $n_s \in \{0, 1, \ldots, 79\}$
- −240 kHz: $n_s \in \{0, 1, \ldots, 159\}$
- −480 kHz: $n_s \in \{0, 1, \ldots, 319\}$ The value $N_{CP}$ has the same value as that defined in Equation 6.

That is, the value $N_{CP}$ is "1" in the case of a normal CP and is "0" in the case of an extended CP.

$c_{init}$ of Equation 8 is used for m-sequence initialization, subcarrier spacing may be 15 kHz or 30 kHz.

The reason why subcarrier spacing numerology other than 15 kHz and 30 kHz cannot be used is that the value $c_{init}$ of Equation 8 exceeds $2^{31}$.

For reference, if subcarrier spacing is 60 kHz and $N_{ID}=1007$, l=13, $n_s=39$, $\log_2(c_{init})=31.141$.

In order to supplement this (i.e., in order to support subcarrier spacing numerology other than 15 kHz and 30 kHz), an m-sequence initialization value, such as Equation 9, may be defined.

$$c_{init}=2^{11} \times ((14(n_s+1)+l+1)(2N_{ID}+1) \bmod 2^{20})+2N_{ID}+N_{CP} \quad \text{[Equation 9]}$$

In Equation 9, "A mod B" means modulo operation meaning the remainder obtained by dividing A by B.

If a total number of slots included in a 10 ms duration frame is 10, 20, 40 or 80 (corresponding subcarrier spacings are 15 kHz, 30 kHz, 60 kHz, and 120 kHz, respectively) by supplementing Equation 9, an m-sequence initialization value may be configured as in Equation 10 so that a different sequence initialization value can be used for each OFDM symbol during 10 ms.

$$c_{init}=2^{10} \times ((14n_s+l+1)(N_{ID}+1) \bmod 2^{21})+N_{ID}+1 \quad \text{[Equation 10]}$$

Furthermore, in $N_{ID}+1$ of Equation 10, "+1" is for preventing Equation 10 from becoming "0". "+1" may be deleted if the range of the value $N_{ID}$ is set as a natural number not zero.

In Equation 10, when '+1' is 0, Equation 10 represents the same equation as Equation 11 and can be proved by Equation 12 to Equation 15.

$$c_{init}=(2^{10} \times (14n_s+l+1)(N_{ID}+1)+N_{ID}) \bmod 2^{31} \quad \text{[Equation 11]}$$

In Equation 11, Let us denote $X=2^{10} \times X'$, where $X'=(14n_s+l+1)(2N_{ID}+1)$.

The relation of Equation 12 is established by a modulo operation distribution property.

$$c_{init}=(X+Y) \bmod 2^{31}=(X \bmod 2^{31}+N_{ID} \bmod 2^{31}) \bmod 2^{31} \quad \text{[Equation 12]}$$

In Equation 12, $0 \leq N_{ID} \leq 1023$, Equation 13 and Equation 14 are defined.

$$N_{ID} \bmod 2^{31}=N_{ID} \quad \text{[Equation 13]}$$

$$X \bmod 2^{31}=(2^{10} \times X') \bmod 2^{31}=2^{10}(X' \bmod 2^{21}) \quad \text{[Equation 14]}$$

For example, the remainder of 8y division 3y is always 2y. Therefore, 8y mod 3y=y×(8 mod 3), and Equation 14 can be defined.

So, Equation 12 can be expressed by below Equation 15.

$$(X \bmod 2^{31} + N_{ID} \bmod 2^{31}) \bmod 2^{31} = \quad \text{[Equation 15]}$$
$$(2^{10}(X' \bmod 2^{21}) + N_{ID}) \bmod 2^{31} =$$
$$2^{10}(X' \bmod 2^{21}) + N_{ID} =$$
$$2^{10}((14n_s + l + 1)(2N_{ID} + 1) \bmod 2^{21}) + N_{ID}$$

In a second line of Equation 15, the maximum value of $2^{10}(X' \bmod 2^{21})$ is $2^{10}(2^{21}-1)=2^{31}-2^{10}$, and the maximum value of N_ID is $2^{10}-1$.

Therefore, the maximum value in the parentheses in the ( )mod $2^{31}$ of the second line of the above Equation 15 is $2^{31}-2^{10}+2^{10}-1=2^{31}-1$, ( )mod $2^{31}$ in the second line can be omitted.

As a result, Equation 10 and Equation 11 are the same equations.

Compared to the aforementioned existing RS sequence initialization methods, in an RS sequence initialization method proposed in this specification, not modulo operation for time, but modulo operation is adopted by incorporating all of factors (e.g., $N_{ID}$) capable of indicating a CSI-RS ID, cell ID or temporary UE ID.

Furthermore, in two or more RS (e.g., a CSI-RS and a DMRS), Equation 10 may be identically used for RS initialization.

In this case, the value $N_{ID}$ of Equation 10 may be differently changed depending on an RS type.

The term "change" used in this specification may be expressed as a "configuration" or "definition."

Furthermore, if a total number of slots included in the 10 ms duration frame (or radio frame) is 80 (subcarrier spacing 120 kHz), a different sequence initialization value may be used for each OFDM symbol during 10 ms.

If $N_{ID}=1007$, $l=13$, $n_s=79$, $\log_2(c_{init})=30.124$, $\log_2(14n_s+l+1)(N_{ID}+1)=20.124$.

In contrast, if subcarrier spacing is 240 kHz and 480 kHz, a total of 160 slots and a total of 320 slots are respectively included in the 10 ms duration frame.

Accordingly, as in Equation 10, if additional operation, such as modulo operation, is not present, a different sequence initialization value cannot be used in all of OFDM symbols for 10 ms.

If $N_{ID}=1007$, $l=13$, $n_s=159$, $\log_2(c_{init})=31.116$.

When Equation 10 is used for CSI-RS sequence initialization, in a system having subcarrier spacing numerology 480 kHz (320 slots are included in the 10 ms frame), if $N_{ID}=511$ is set in a 512-th cell (or eNB) (cell ID 511 indexed from 0) or a specific cell, a sequence initialization value that had been previously used may be used at intervals of $2^{12}$ OFDM symbols in the 10 ms duration frame.

This is a problem that occurs because $2^9$ is the greatest common denominator of $2^{21}$ and $2^9$. A 512-th cell ID, that is, $N_{ID}=511$, may be excluded.

$N_{ID}=512$ may be used instead of $N_{ID}=511$, and the index may be increased by 1 from a 513-th cell ID and/or a 513-th scrambling ID.

"A and/or B" used in this specification may be construed as having the same meaning as that "at least one of A and B is included."

That is, $N_{ID} \in \{1, 2, 3, \ldots, 510, 512, 513, \ldots, 1008\}$ may be defined or configured.

Alternatively, an index corresponding to the 512-th cell ID and/or 512-th scrambling ID may be set as $N_{ID}=1008$.

In Equation 9, modulo operation is performed on the results multiplied by $(2N_{ID}+1)$, unlike in Equation 10 in which modulo operation is performed on the results obtained by multiplying an equation including a slot index and an OFDM symbol index by $(N_{ID}+1)$.

$2N_{ID}+1$ is always an add number regardless of the value $N_{ID}$. Accordingly, a value multiplied with respect to the equation including a slot index and an OFDM symbol index does not become $2^9$.

Accordingly, a sequence initialization value can be prevented from being used again during the 10 ms frame with respect to all of cell IDs and/or all of scrambling IDs.

Accordingly, as in Equation 9 suggested for sequence initialization, modulo operation of the product of $2^{20}$ or a value greater than $2^{20}$, such as $2^{21}$ or $2^{22}$, and a $(2N_{ID}+1)$ value has a technologically important meaning.

In order to (bits) change the amount of information allocated to a UE-specifically configured scrambling ID, the modulo value of Equation 10 may be changed.

Furthermore, for interference randomization between different cells, a different cell may use a different modulo value (of Equation 10).

In order to avoid unnecessary modulo operation from the implementation viewpoint of a UE, Equation 16 and Equation 17 may be defined if modulo operation is necessary.

$$c_{init} = 2^{10} \times Q + N_{ID} + 1 \quad \text{[Equation 16]}$$

$$Q = \begin{cases} (14n_s + l + 1)(N_{ID} + 1) \bmod 2^{21} & \text{for } n_s > K \\ (14n_s + l + 1)(N_{ID} + 1) & \text{for } n_s \leq K, \end{cases} \quad \text{[Equation 17]}$$

In this case, the value K may be defined as a maximum of 146. That is, the value K may be defined as one of natural number values of 146 or less.

Furthermore, an eNB may indicate or configure the value K in a UE through higher layer signaling, such as radio resource control (RRC).

Furthermore, if one or more IDs per cell are necessary, the range of the value $N_{ID}$ may be used for sequence initialization by introducing a factor, such as a temporary UE ID, having a value greater than the number of cell IDs or greater than a feasible range of a cell ID.

For convenience sake, the notation $N_{ID}$ is used without any change, and an m-sequence initialization value (the second m-sequence initialization value configuring the Gold sequence) may be defined like Equation 18 depending on the range of the value (or the range of an introduced factor value when another corresponding factor is introduced).

$$c_{init}=2^M \times ((14n_s+l+1)(N_{ID}+1) \bmod 2^{N-M})+N_{ID}+1 \quad \text{[Equation 18]}$$

In this case, M≤N, N≥3, both M and N are natural numbers, and $N_{ID} \in \{0, 1, 2, \ldots, 2^M-1\}$.

Furthermore, in Equation 17, Equation 10 may be modified assuming a specific K value.

For example, assuming that K=79, a sequence initialization value may be defined like Equation 19.

$$c_{init} = 2^{10} \times ((14 \times (n_s \bmod 80) + l + 1)(N_{ID}+1)) + N_{ID} + 1 \quad \text{[Equation 19]}$$

As in Equation 9, if the number of slots included in the 10 ms duration frame is greater than 80, a sequence initialization value is reused in the cycle of 80 slots.

A sequence initialization configuration method proposed in this specification may be applied in common to several types of RSs, such as a CSI-RS, a TRS, a DMRS and a PTRS, for the easiness, operation and implementation convenience of a reference signal design.

To this end, a sequence initialization value may be configured like Equation 20 by incorporating the RS Type.

$$c_{init} = 2^{M+L} \times ((14n_s + l + 1)(N_{ID}+1) \bmod 2^{N-M-L}) + 2^M \times N_{Type} + N_{ID} + 1 \quad \text{[Equation 20]}$$

In this case, $N_{ID} \in \{0, 1, \ldots, 2^M-1\}$, $N \in \{31, 63\}$, $N_{Type} \in \{0, 1, \ldots, 2^L-1\}$.

M is an integer smaller than N. L is a natural number including 0 and is the number of bits indicative of an RS type. $N_{ID}$ is a cell ID or CSI-RS ID and is set through higher layer signaling.

Equation 20 shows that a portion indicative of an RS type has been added by introducing $N_{Type}$ into Equation 18.

For example, assuming that m-sequence initialization is performed on a CSI-RS, a DMRS, a TRS, and a PTRS using one Equation 15, the CSI-RS, DMRS, TRS and PTRS may be set or defined as $N_{Type}$=0, 1, 2, 3, respectively.

Equation 20 may be expressed like Equation 16 or Equation 17 with respect to specific M, N, L values.

Furthermore, since a maximum K value can be intuitively calculated based on the M, N, L values, it may be considered to be included in the contents of the present invention.

In Equation 20, a function N(D) for CSI-RS RE density may be defined instead of $N_{Type}$.

In this case, whether a sequence initialization value is a sequence initialization value to be used for a CSI-RS for obtaining channel information or a CSI-RS to be used for fine time-frequency tracking may be identified based on the CSI-RS RE density.

For example, N(3)=0, and N(D)=1 for D=1 and $$D = \frac{1}{2}.$$

If N(D)=0, a UE may recognize a sequence initialization value as a CSI-RS sequence initialization value for fine time-frequency tracking. If N(D)=1, a UE may recognize a sequence initialization value as a CSI-RS sequence initialization value for CSI acquisition.

In Equation 20, the use of a configured CSI-RS may be identified by allocating 2 bits to $N_{Type}$.

That is, the use of the CSI-RS may be a CSI-RS for CSI acquisition, a CSI-RS for beam management, or a CSI-RS for fine time-frequency tracking.

For example, the use of the CSI-RS may be defined as a CSI-RS for fine time-frequency tracking if $N_{Type}$=0, a CSI-RS for CSI acquisition if $N_{Type}$=1, and a CSI-RS for beam management if $N_{Type}$=2.

For another example, two of the three types of a CSI-RS for CSI acquisition, a CSI-RS for beam management, and a CSI-RS for fine time-frequency tracking may be configured or defined to be identified based on each bit value by allocating 1 bit to $N_{Type}$.

The M-sequence initialization value of Equation 10 may be defined to adopt modulo operation of $2^{31}$ on the entire M-sequence initialization value as in Equation 21.

$$c_{init} = (2^{10} \times ((14n_s + l + 1)(N_{ID}+1)) + N_{ID}) \bmod 2^{31}) + 1 \quad \text{[Equation 21]}$$

When a length-31 gold sequence is used, if subcarrier spacing numerology is 120 kHz or more that is relatively great, the reuse of a sequence initialization value can be minimized by defining L=0 in Equation 20 and excluding a portion indicative of an RS type.

If Equation 21 is used for the initialization of a CSI-RS sequence, in a system having subcarrier spacing numerology of 480 kHz (i.e., 320 slots are included in the 10 ms frame), as in Equation 10, if $N_{ID}$=511 is set in a 512-th cell (or eNB) (cell ID 511 indexed from 0) or a specific cell, a sequence initialization value that had been previously used may be used again at intervals of $2^{12}$ OFDM symbols in the 10 ms duration frame.

Accordingly, as described above, a 512-th cell ID, that is, $N_{ID}$=511 may be excluded.

As in the case where Equation 10 is extended (or modified) into Equation 20, Equation 9 may be intuitively extended like Equation 22 by incorporating a factor for an RS-type.

$$c_{init} = 2^{M+L} \times ((14n_s + l + 1)(2N_{ID}+1) \bmod 2^{N-M-L}) + 2^M \times N_{Type} + N_{ID} + 1 \quad \text{[Equation 22]}$$

In this case, $N_{ID} \in \{0, 1, \ldots, 2^M-1\}$, and N is a natural number greater than or equal to 31.

$N_{Type} \in \{0, 1, \ldots, 2^L-1\}$. M is an integer smaller than N, and L is a natural number including 0 and means the number of bits indicative of an RS type.

$N_{ID}$ is a cell ID or CSI-RS ID and is set through higher layer signaling.

Furthermore, unlike in Equation 9, $N_{ID}+1$ not $2N_{ID}+1$ is added to the last.

It may be seen that a bit to identify an NCP/ECP is excluded.

However, a sequence initialization value has been prevented from being reused depending on a scrambling ID by multiplying $2N_{ID}+1$ in front of the modulo operation, unlike in Equation 20.

That is, Equation 22 may be modified into Equation 23 and Equation 24.

$$c_{init} = 2^{M+L} \times (((14n_s + l + 1)(2N_{ID}+1)) + 2^M \times N_{Type} + N_{ID}) \bmod 2^N + 1 \quad \text{[Equation 23]}$$

$$c_{init} = 2^{M+L} \times (((14n_s + l + 1)(2N_{ID}+1)) + 2^M \times N_{Type}) \bmod 2^{N-M} + N_{ID} + 1 \quad \text{[Equation 24]}$$

N is a natural number greater than or equal to 31.

As described above, Equations 9, 22, 23 and 24 adopt the multiplication of $(2N_{ID}+1)$ and the modulo operation.

In this case, a portion multiplied in $(14n_s+l+1)$ cannot become $2^9$ in the equations because the value $2N_{ID}+1$ is always an add number regardless of the value $N_{ID}$.

That is, a sequence initialization value can be prevented from being used again within one frame regardless of the value $N_{ID}$.

Accordingly, for sequence initialization, as in Equation 9, the modulo operation of the product of a $2^{20}$ or a value greater than $2^{20}$, such as $2^{21}$ or $2^{22}$, and the $(2N_{ID}+1)$ value, has a technologically important meaning.

In addition to $2N_{ID}+1$, as in $4N_{ID}+1$, with respect to all of $N_{ID}$ values, a term multiplied with respect to $(14n_s+l+1)$ (or an equation including a slot index and an OFDM symbol index) may be used as not having a $2^P$ (p is a natural number greater than or equal to 9) value.

That is, $4N_{ID}+1 \neq 2^P$ is satisfied with respect to all of $N_{ID}$ ($N_{ID} \in \{1, 2, 3, \ldots, 1007\}$) and $p(p \in \{9, 10, 11, 12, 13, 14\})$.

Accordingly, in addition to $2N_{ID}+1$ and $4N_{ID}+1$, to multiply a slot index and/or an OFDM symbol index by an equation not having a value, such as $2^P$ (p is a natural number greater than or equal to 9), with respect to the $N_{ID} \in \{1, 2, 3, \ldots, 1007\}$ value and/or a function for $N_{ID}$ for PN sequence initialization and to perform modulo operation may be considered to be included in the contents of the present invention.

In another embodiment, a method of using a different sequence between ports between CDM groups and using the same sequence in ports within a CDM group is described.

Contents to be described later may operate based on the aforementioned method of configuring (or determining) the initialization of an RS sequence or may operate separately.

In the LTE system, a length-M PN sequence is generated with respect to all of CSI-RS ports within one OFDM symbol, and a (valid) length-1 sequence for each PRB is identically allocated to all of 12 subcarriers.

In this case, M indicates the number of CSI-RSs allocated to an RB(s).

In this case, if a specific sequence has unexpectedly a high cross correlation with the sequence of a neighbor cell, CSI acquisition performance for all of CSI-RS ports may be greatly deteriorated.

Accordingly, in NR, different PN sequences need to be allocated to CSI-RS ports within a CDM group.

Additionally, a length-2 sequence per RB may be used in one OFDM symbol because each CSI-RS port may occupy 2 contiguous frequency REs per RB in a given OFDM symbol.

A PN sequence has a lower cross correlation as the length of the sequence increases.

Figure 4:
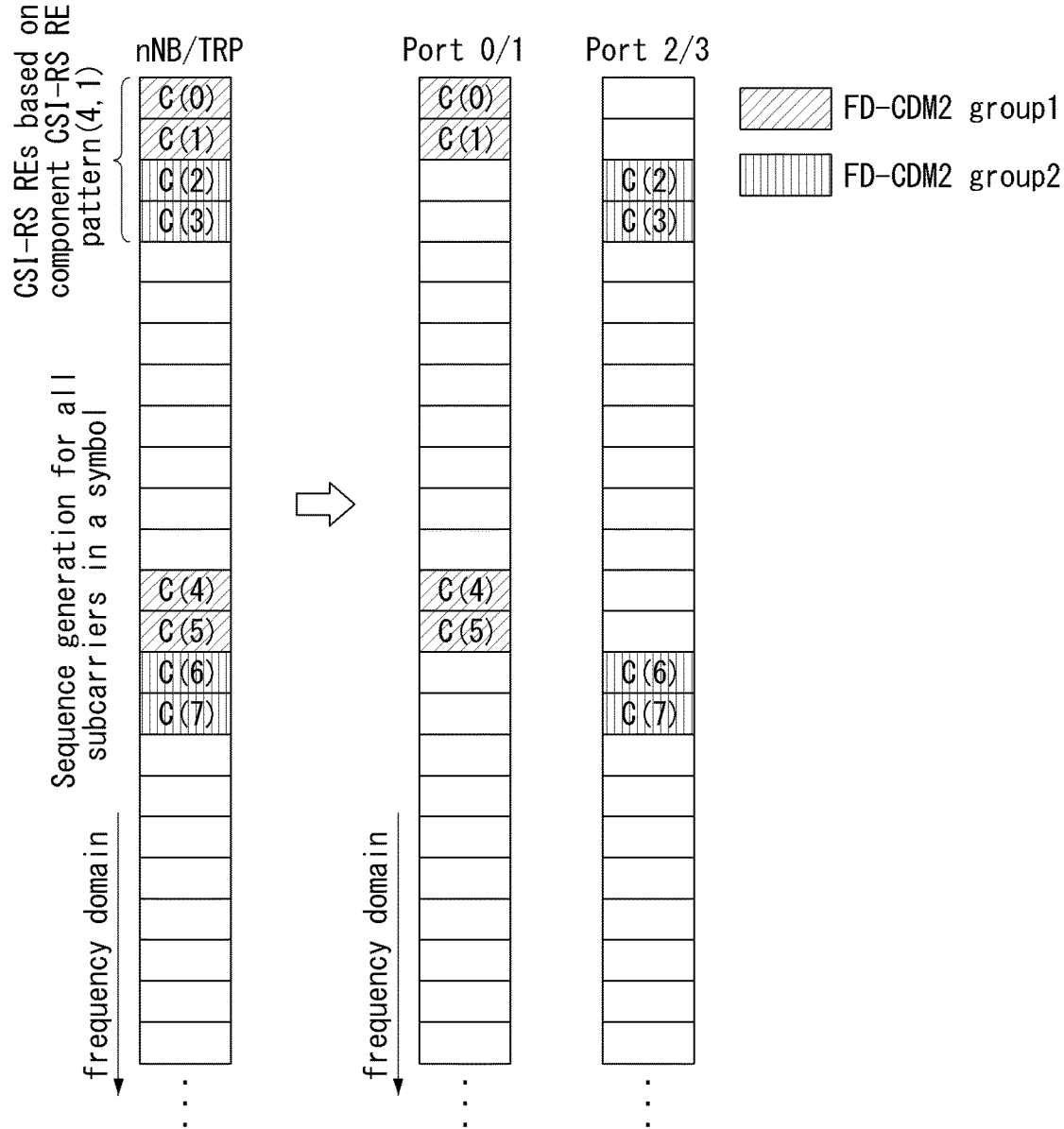
FIG. 4 is a diagram showing an example of a PN sequence mapping method for a 4-port CSI-RS, which is proposed in this specification.

In order to give an independent interference randomization effect to a CSI-RS port group having excellent cross correlation performance compared to LTE, different sequence elements indicated by C(k) in FIG. 4 are allocated to all of CSI-RSs allocated to an RE in a given OFDM symbol so that CSI-RS ports of different CDM groups are mapped to different sequences.

K is a value indicative of 0, 1, 2, 3, 4, 5, 6, . . . .

Furthermore, to allocate different sequences to different CSI-RS ports form one CDM group is impossible because orthogonality is not guaranteed (a UE cannot orthogonal separate them based on configured OCC code).

Accordingly, sequences between port groups are differently configured by mapping the same sequence element to CSI-RS ports that form a specific CDM group.

If the same sequence is mapped to all of CSI-RS ports and has very high correlation with the sequence of a neighbor cell, performance may be deteriorated when CSI acquisition and/or beam management (BM) are performed.

Accordingly, in the method proposed in this specification, although a CSI-RS sequence configured in a specific port group is subjected to great interference influence, different CSI-RS ports are subjected to less interference influence as a kind of diversity effect.

Accordingly, general performance of a system can be prevented from being greatly deteriorated.

FIG. 4 is a diagram showing an example of a PN sequence mapping method for a 4-port CSI-RS, which is proposed in this specification.

In the aforementioned contents, a sequence length per PRB may become long depending on the CDM length of a frequency domain.

For example, if frequency domain (FD)-CDM4 is configured, some sequence length of a total sequence length mapped to each CSI-RS port may be 4 or 4 or less per RB.

Furthermore, in the aforementioned contents, in CSI-RS ports forming the same CDM group, one sequence element may be mapped per RB in a specific OFDM symbol.

Figure 5:
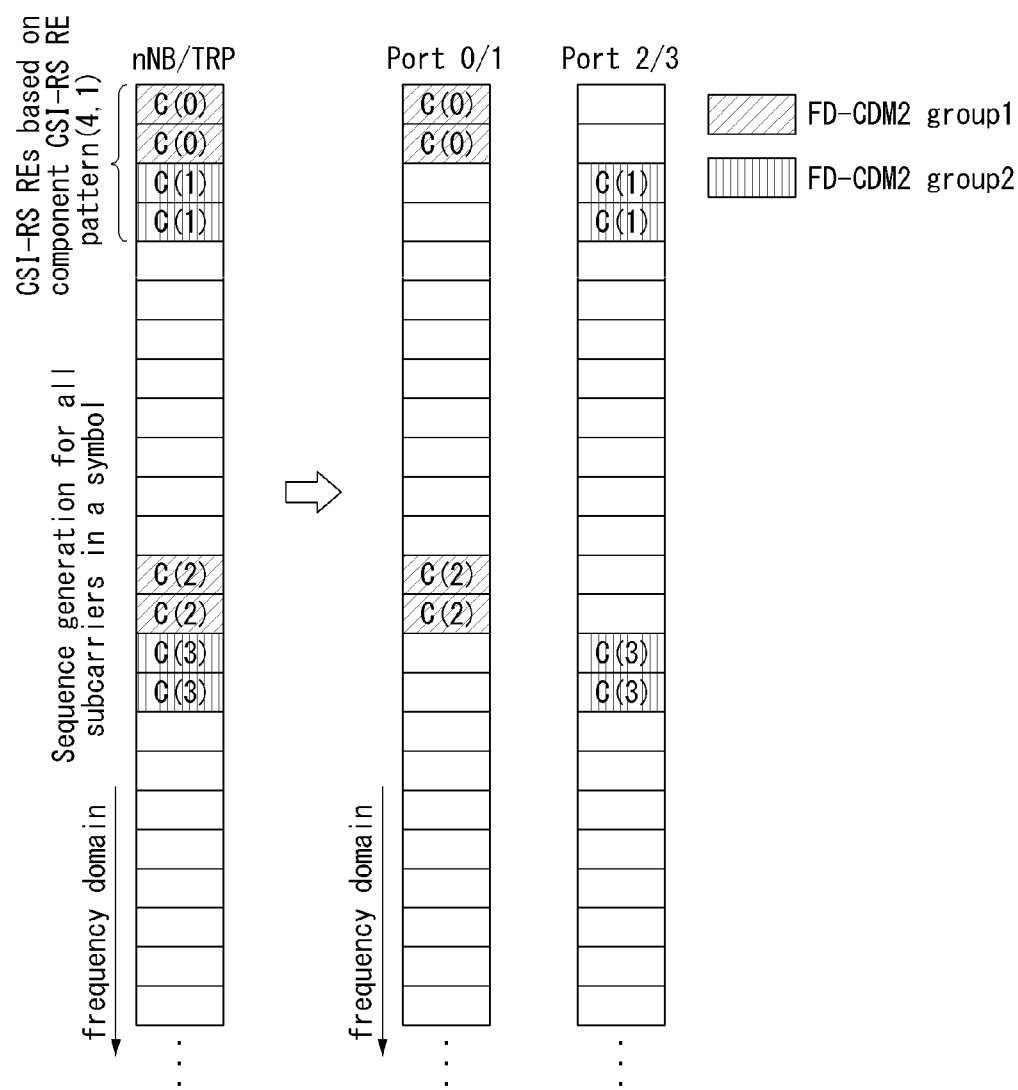
FIG. 5 is a diagram showing another example of PN sequence mapping for a 4-port CSI-RS, which is proposed in this specification.

For this, reference is made to FIG. 5.

Discrete Fourier transform (DFT)-based OCC rather than Walsh code may be used or configured as orthogonal cover code (OCC) by considering that a spatial correlation between CSI-RS ports is high.

Additionally, in order to increase an interference randomization effect between different cells, a sequence may be mapped based on a frequency location where a component CSI-RS RE pattern is configured.

A sequence element is mapped to all of subcarrier REs on a CSI-RS transmission bandwidth (BW) with respect to (a resource element). Sequence elements are mapped to an RE corresponding to the location of a configured (or indicated) component CSI-RS RE pattern.

In this case, one component CSI-RS RE pattern may include at least one CDM group.

The same sequence elements are mapped to CSI-RS ports that form the same CDM group.

Figure 6:
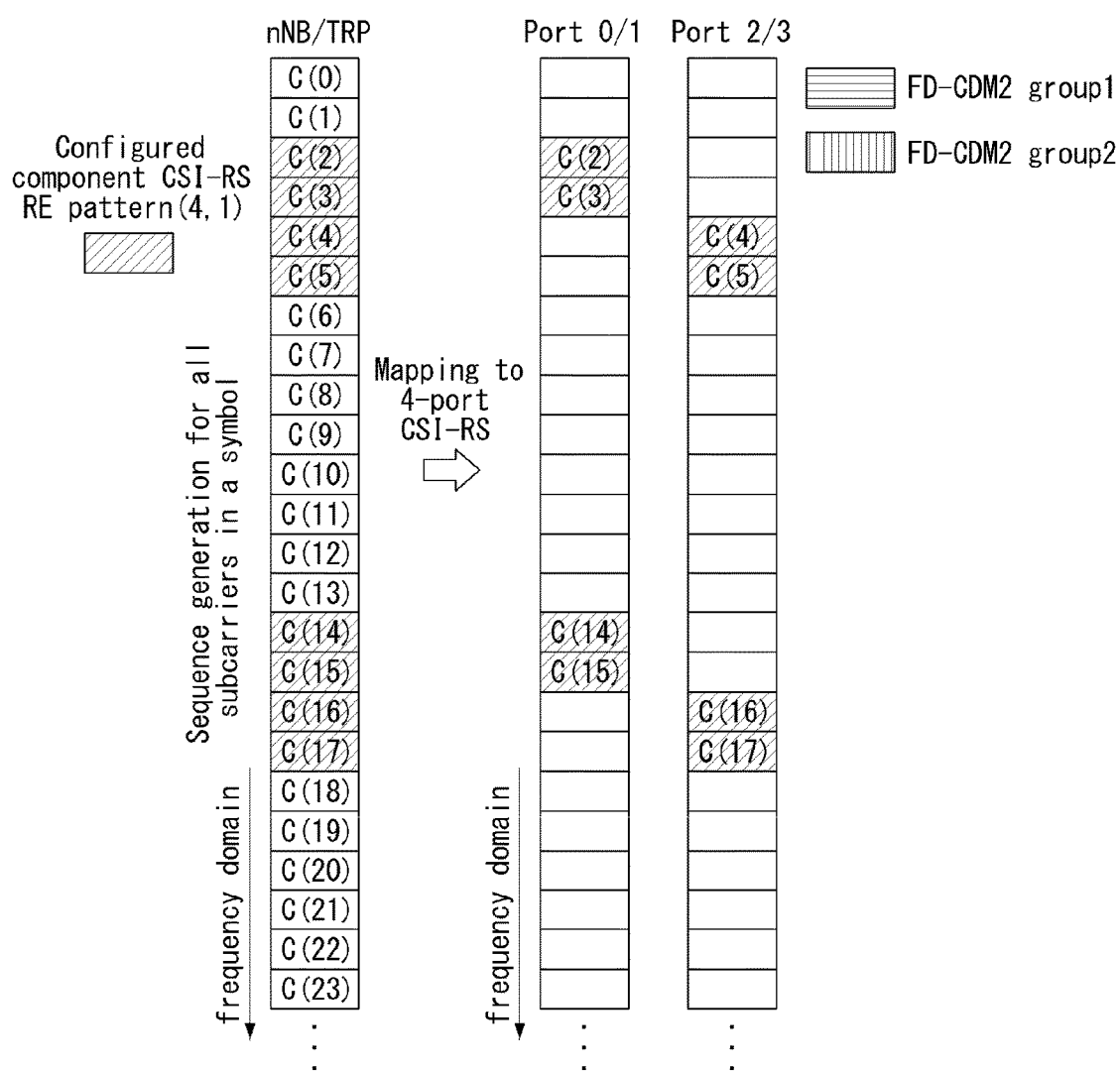
FIG. 6 is a diagram showing yet another example of PN sequence mapping for a 4-port CSI-RS, which is proposed in this specification.

For example, if a component CSI-RS RE pattern (4,1) to determine an RE pattern for a 4-port CSI-RS is configured in a subcarrier RE index 2, 3, 4, 5 (indexing from 0), the same sequence is mapped to a port 0/1 and the same sequence is mapped to a port 2/3 as in FIG. 6.

The value of '4' in the component CSI-RS RE pattern (4,1) means that the number of adjacent REs in the frequency domain is 4. The value of '1' means that the number of adjacent REs in the time domain is one.

If the location of the component CSI-RS RE pattern (4,1) is different, other sequence elements may be mapped.

For inter-cell interference randomization, a (subcarrier index) region in which a component CSI-RS RE pattern may be configured may be different depending on a cell ID.

FIG. 5 is a diagram showing another example of PN sequence mapping for a 4-port CSI-RS, which is proposed in this specification.

In FIG. 5, one sequence element for each PRB is mapped to each CSI-RS port.

FIG. 6 is a diagram showing yet another example of PN sequence mapping for a 4-port CSI-RS, which is proposed in this specification.

A sequence mapping method proposed in this specification may also be applied to other RSs, such as a DMRS, TRS, and PT-RS, in addition to a CSI-RS.

Figure 7:
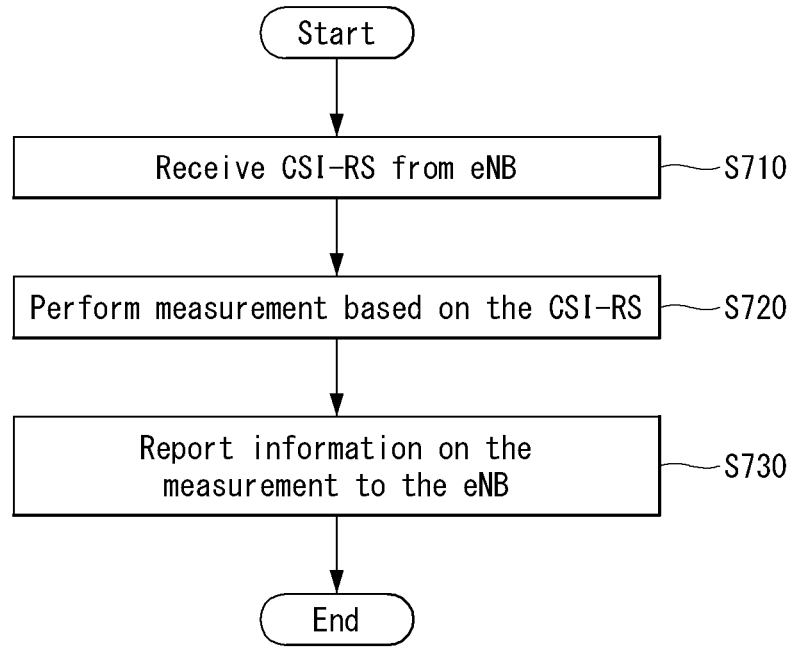
FIG. 7 is a flowchart showing an operation of a UE for determining an initialization value of a sequence, which is proposed in this specification.

FIG. 7 is a flowchart illustrating an operation of a UE for performing the method proposed in this specification.

First, the UE receives a channel state information-reference signal (CSI-RS) from a base station (an eNB) (S710).

And, the UE performs measurement based on the CSI-RS (S720).

Here, the measurement may include a step of estimating a channel using CSI-RS and a step of computing CSI.

And, the UE reports information on the measurement to the base station (S730). Here, the information on the measurement may mean channel state information (CSI).

A sequence for the CSI-RS is generated using a pseudo-random sequence. The generated sequence is mapped to resource element (RE)s.

Furthermore, an initialization value of the pseudo-random sequence may be determined based on the product a first factor and a second factor.

The first factor may be (a number of OFDM symbols within a slot×a slot index+an OFDM index within a slot+1). The second factor may be (2×scrambling ID+1).

Furthermore, the initialization value of the pseudo-random sequence may be determined based on a value obtained by performing modulo operation of $2^N$ on a third factor. The third factor may be determined based on the product of the first factor and the second factor.

More specifically, the third factor is ($2^M$×(first factor)×(second factor)+scrambling ID). The N is a natural number greater than or equal to 31. The M is an integer smaller than N.

The N is 31. The M may be 10. The number of OFDM symbols within the slot may be 14.

Furthermore, the scrambling ID has $2^M-1$ from 0.

The initialization value of the pseudo-random sequence may have a different value for each OFDM symbol within a radio frame.

Furthermore, the resource element (RE)s may be a concept including at least one of a time, a frequency and an antenna port.

The resource element (RE)s may include at least one code division multiplexing (CDM) group.

As we have seen, the same sequence is used for antenna ports in one CDM group, and different sequences can be used for antenna ports between different CDM groups.

Figure 8:
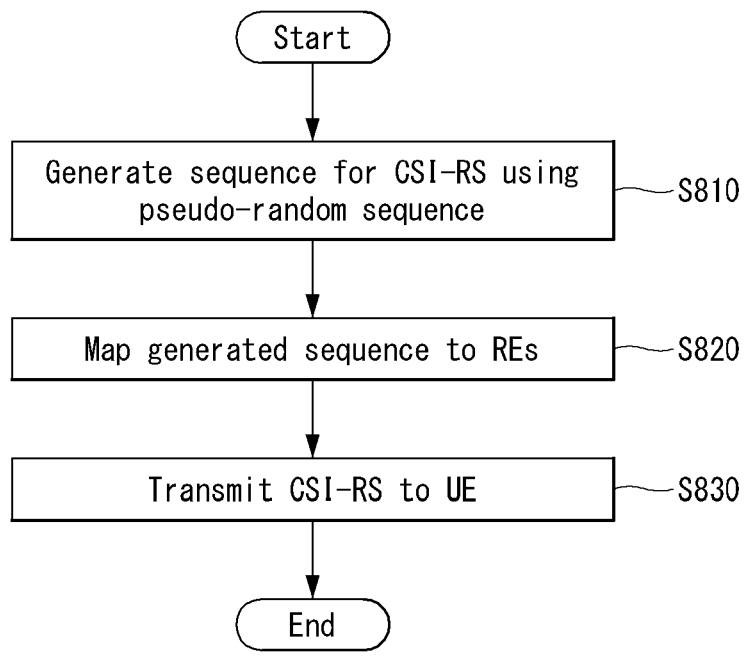
FIG. 8 is a flowchart showing an operation of an eNB for determining an initialization value of a sequence, which is proposed in this specification.

FIG. 8 is a flowchart illustrating an operation of a base station for performing the method proposed in this specification.

First, a base station (an eNB) generates a first sequence of a channel state information-reference signal (CSI-RS) based on a pseudo-random sequence (S810).

Furthermore, the eNB may map the first sequence to resource element (RE)s (S820).

And, the eNB transmits the CSI-RS to the UE on the mapped resource element (RE)s (S830).

Or, by the S820 and S830, the eNB may transmit the first sequence to the UE on the REs.

In this case, the initialization value of the pseudo-random sequence may be determined based on the product of a first factor and a second factor. The first factor may be (a number of OFDM symbols within a slot×a slot index+an OFDM index within a slot+1). The second factor may be (2×scrambling ID+1).

Furthermore, the initialization value of the pseudo-random sequence may be determined based on a value obtained by performing modulo operation of $2^N$ on a third factor. The third factor may be determined based on the product of the first factor and the second factor.

More specifically, the third factor is ($2^M$×(first factor)×(second factor)+scrambling ID). The N is a natural number greater than or equal to 31. The M is an integer smaller than N.

The N is 31. The M may be 10. The number of OFDM symbols within the slot may be 14.

Furthermore, the scrambling ID has $2^M-1$ from 0.

More specifically, the initial value of the pseudo-random sequence may be determined by the following equation (24) or (25).

$$c_{init}=(2^M\times((14n_s+l+1)(2N_{ID}+1))+N_{ID})\bmod 2^N \quad \text{[Equation 24]}$$

$$c_{init}=(2^M\times((14n_s+l+1)(2N_{ID}+1))+N_{ID})\bmod 2^N+1 \quad \text{[Equation 25]}$$

The initialization value of the pseudo-random sequence may have a different value for each OFDM symbol within a radio frame.

Furthermore, the resource element (RE)s may be a concept including at least one of a time, a frequency and an antenna port.

The resource element (RE)s may include at least one code division multiplexing (CDM) group.

As we have seen, the same sequence is used for antenna ports in one CDM group, and different sequences can be used for antenna ports between different CDM groups.

General Apparatus to which the Present Invention may be Applied

Figure 9:
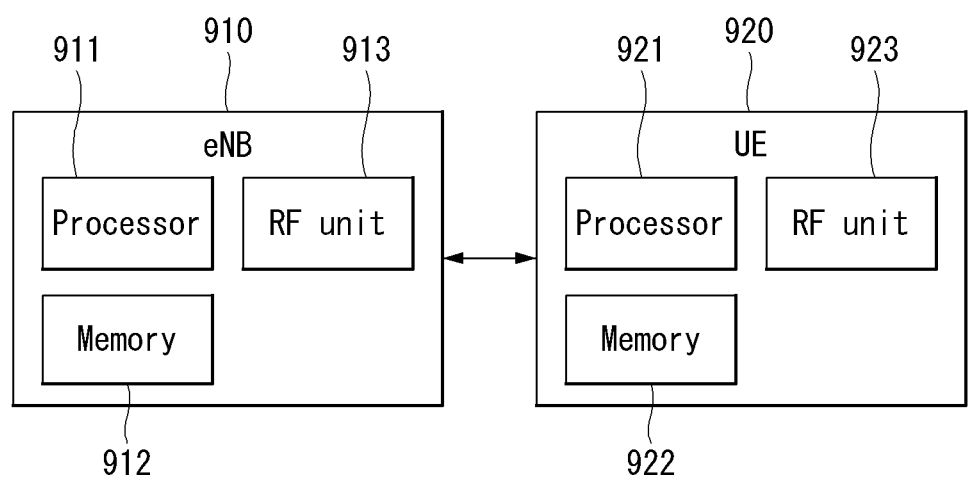
FIG. 9 illustrates a block diagram of a wireless communication device to which the methods proposed in this specification may be applied.

FIG. 9 illustrates a block diagram of a wireless communication device to which the methods proposed in this specification may be applied.

Referring to FIG. 9, the wireless communication system includes an eNB 910 and multiple UEs 920 positioned within an eNB region.

The eNB and the UE may be expressed as respective radio devices.

The eNB 910 includes a processor 911, a memory 912 and a radio frequency (RF) module 913. The processor implements the functions, processes and/or methods proposed in FIGS. 1 to 8. The layers of a radio interface protocol may be implemented by the processor. The memory is connected to the processor and stores a variety of types of information for driving the processor. The RF module is connected to the processor and transmits and/or receives radio signals.

The UE includes a processor 921, a memory 922 and an RF module 923.

The processor implements the functions, processes and/or methods proposed in FIGS. 1 to 8. The layers of a radio interface protocol may be implemented by the processor. The memory is connected to the processor and stores a variety of types of information for driving the processor. The RF module is connected to the processor and transmits and/or receives radio signals.

The memory 912, 922 may be positioned inside or outside the processor 911, 921 and may be connected to the processor by various well-known means.

Furthermore, the eNB and/or the UE may have a single antenna or multiple antennas.

Furthermore, in this specification, the RF module may be expressed as a transceiver.

Figure 10:
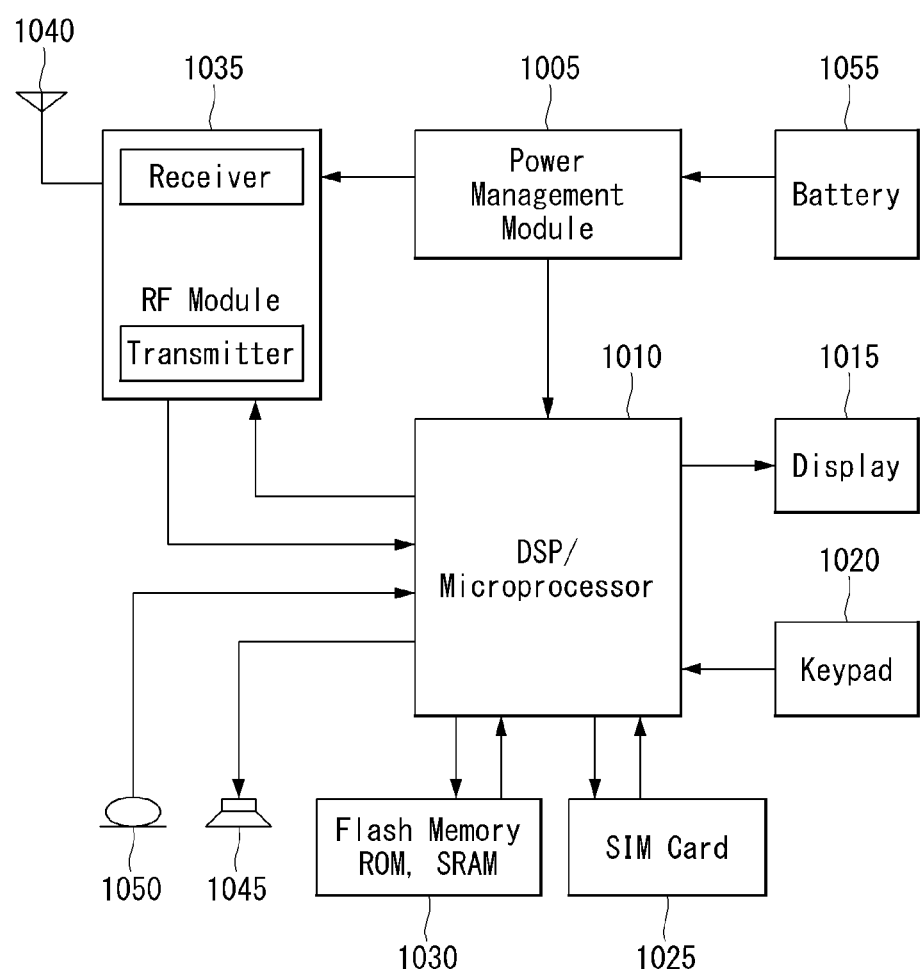
FIG. 10 illustrates a block diagram of a communication device according to an embodiment of the present invention.

FIG. 10 illustrates a block diagram of a communication device according to an embodiment of the present invention.

In particular, FIG. 10 is a diagram showing the UE of FIG. 10 more specifically.

Referring to FIG. 10, the UE may include a processor (or digital signal processor (DSP)) 1010, an RF module (or RF unit) 1035, a power management module 1005, an antenna 1040, a battery 1055, a display 1015, a keypad 1020, a memory 1030, a subscriber identification module (SIM) card 1025 (this element is optional), a speaker 1045, and a microphone 1050. The UE may further include a single antenna or multiple antennas.

The processor 1010 implements the functions, processes and/or methods proposed in FIGS. 1 to 8. The layers of a radio interface protocol may be implemented by the processor.

The memory is connected to the processor, and stores information related to the operation of the processor. The memory may be positioned inside or outside the processor and may be connected to the processor by various well-known means.

A user inputs command information, such as a telephone number, by pressing (or touching) a button of the keypad 1020 or through voice activation using the microphone 1050, for example. The processor receives such command information and performs processing so that a proper function, such as making a phone call to the telephone number, is performed. Operational data may be extracted from the SIM card 1025 or the memory. Furthermore, the processor may recognize and display command information or driving information on the display 1015, for convenience sake.

The RF module 1035 is connected to the processor and transmits and/or receives RF signals. The processor delivers command information to the RF module so that the RF module transmits a radio signal that forms voice communication data, for example, in order to initiate communication. The RF module includes a receiver and a transmitter in order to receive and transmit radio signals. The antenna 1040 functions to transmit and receive radio signals. When a radio signal is received, the RF module delivers the radio signal so that it is processed by the processor, and may convert the signal into a baseband. The processed signal may be converted into audible or readable information output through the speaker 1045.

Figure 11:
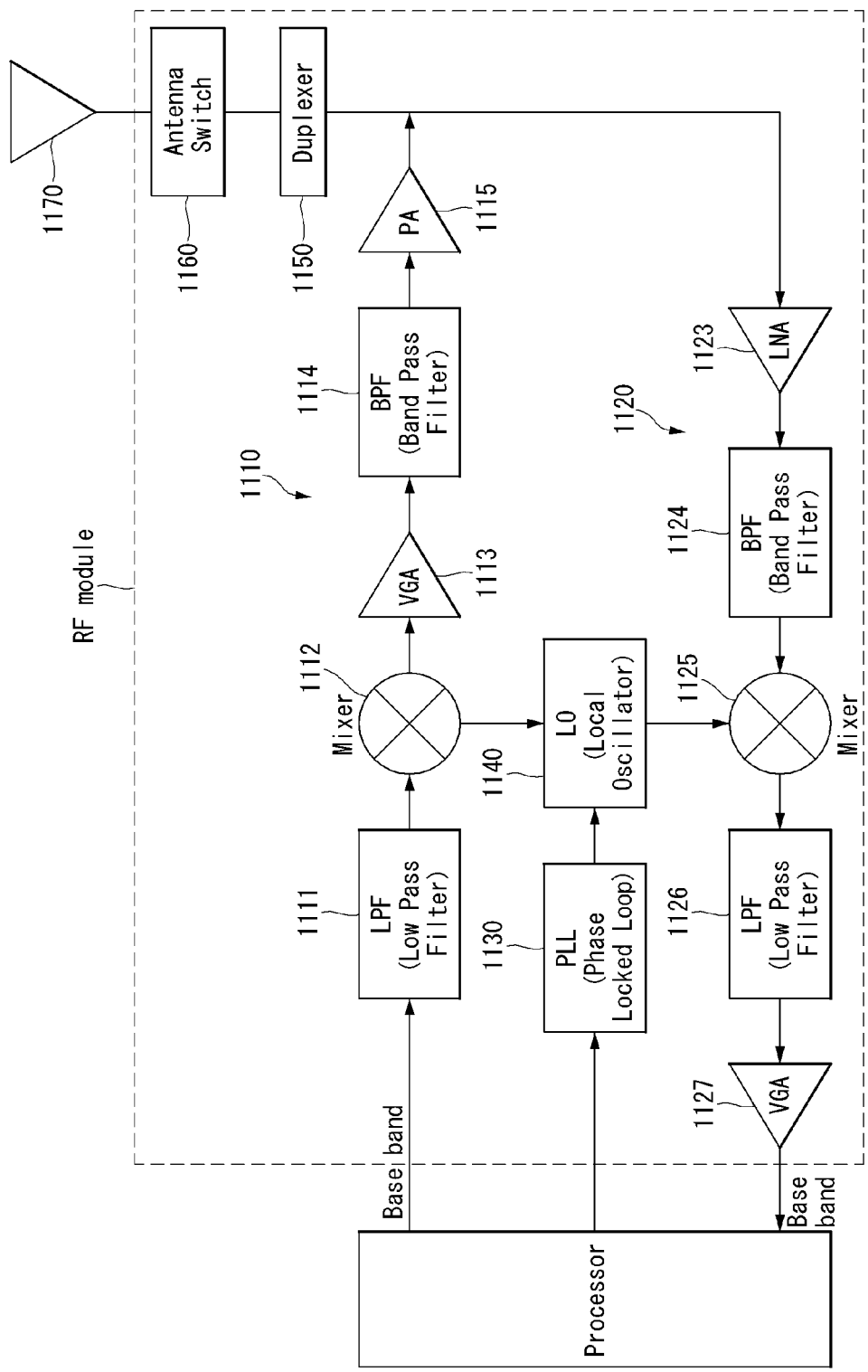
FIG. 11 is a diagram showing an example of the RF module of a wireless communication device to which a method proposed in this specification may be applied.

FIG. 11 is a diagram showing an example of the RF module of a wireless communication device to which a method proposed in this specification may be applied.

Specifically, FIG. 11 shows an example of an RF module that may be implemented in a frequency division duplex (FDD) system.

First, in a transmission path, the processor described in FIGS. 9 and 10 processes data to be transmitted and provides an analog output signal to a transmitter 1110.

In the transmitter 1110, the analog output signal is filtered by a low pass filter (LPF) 1111 in order to remove images caused by digital-to-analog conversion (ADC). The signal is up-converted from a baseband to an RF by a mixer 1112 and is amplified by a variable gain amplifier (VGA) 1113. The amplified signal is filtered by a filter 1114, additionally amplified by a power amplifier (PA) 1115, routed by a duplexer(s) 1150/antenna switch(es) 1160, and transmitted through an antenna 1170.

Furthermore, in a reception path, the antenna 1170 receives signals from the outside and provides the received signals. The signals are routed by the antenna switch(es) 1160/duplexers 1150 and provided to a receiver 1120.

In the receiver 1120, the received signals are amplified by a low noise amplifier (LNA) 1123, filtered by a band pass filter 1124, and down-converted from the RF to the baseband by a mixer 1125.

The down-converted signal is filtered by a low pass filter (LPF) 1126 and amplified by a VGA 1127, thereby obtaining the analog input signal. The analog input signal is provided to the processor described in FIGS. 9 and 10.

Furthermore, a local oscillator (LO) 1140 generates transmission and reception LO signals and provides them to the mixer 1112 and the mixer 1125, respectively.

Furthermore, a phase locked loop (PLL) 1130 receives control information from the processor in order to generate transmission and reception LO signals in proper frequencies, and provides control signals to the local oscillator 1140.

Furthermore, the circuits shown in FIG. 11 may be arrayed differently from the configuration shown in FIG. 11.

Figure 12:
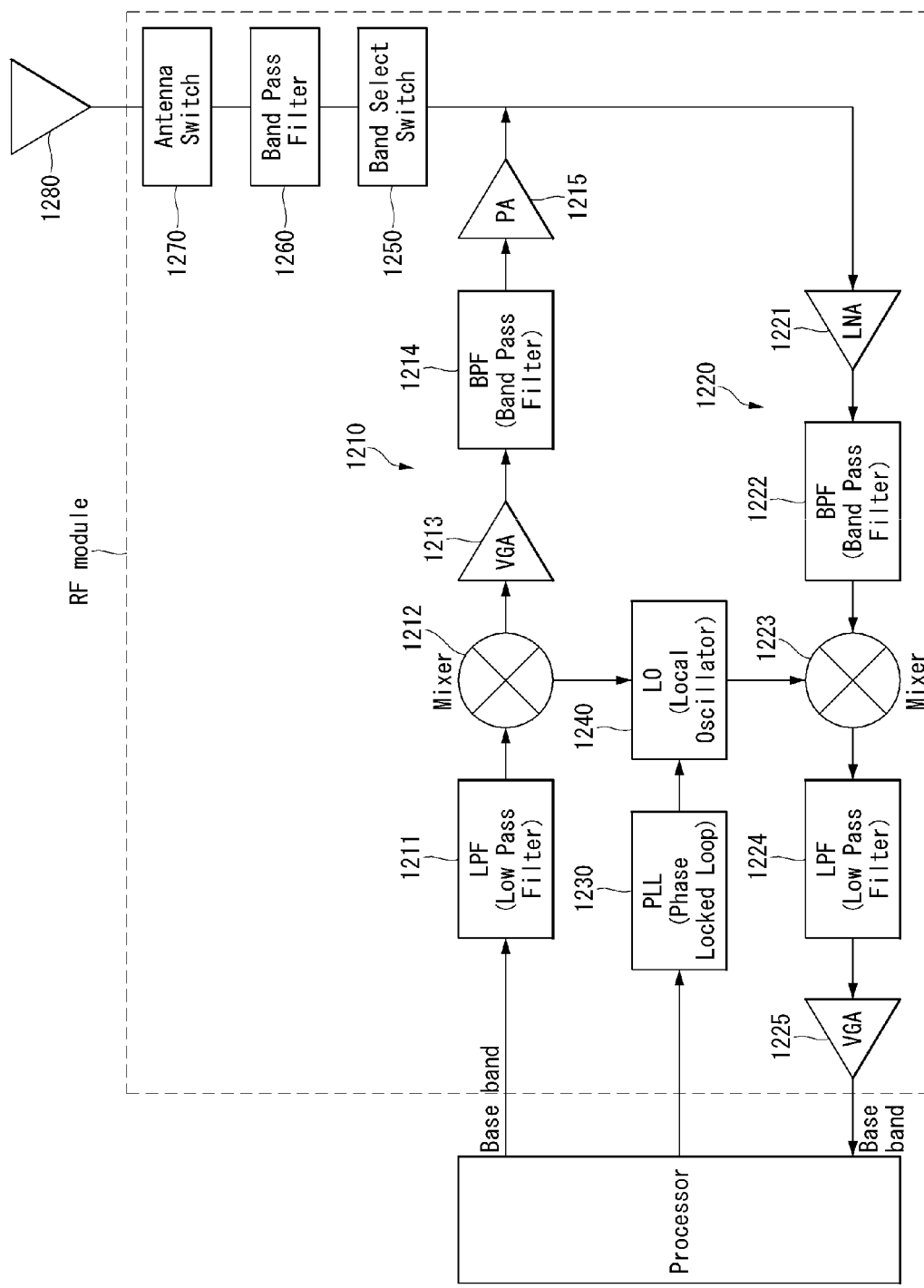
FIG. 12 is a diagram showing another example of the RF module of a wireless communication device to which a method proposed in this specification may be applied.

FIG. 12 is a diagram showing another example of the RF module of a wireless communication device to which a method proposed in this specification may be applied.

Specifically, FIG. 12 shows an example of an RF module that may be implemented in a time division duplex (TDD) system.

The transmitter 1210 and receiver 1220 of the RF module in the TDD system have the same structure as the transmitter and receiver of the RF module in the FDD system.

Hereinafter, only a different structure between the RF module of the TDD system and the RF module of the FDD system is described. Reference is made to the description of FIG. 11 for the same structure.

A signal amplified by the power amplifier (PA) 1215 of the transmitter is routed through a band select switch 1250, a band pass filter (BPF) 1260 and an antenna switch(es) 1270 and is transmitted through an antenna 1280.

Furthermore, in a reception path, the antenna 1280 receives signals from the outside and provides the received signals. The signals are routed through the antenna switch(es) 1270, the band pass filter 1260 and the band select switch 1250 and are provided to the receiver 1220.

In the aforementioned embodiments, the elements and characteristics of the present invention have been combined in specific forms. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the present invention. The sequence of the operations described in the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present invention may be implemented by various means, for example, hardware, firmware, software or a combination of them. In the case of an implementation by hardware, the embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present invention may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

Although the method of configuring the initialization of a reference signal sequence in a wireless communication system of the present invention has been described based on an example in which the method is applied to the 3GPP LTE/LTE-A system and the 5G system (new RAT system), the method may be applied to various wireless communication systems.

This specification has an effect that it can prevent a sequence initialization value from being reused in a radio frame of 10 ms through a specific scrambling ID and/or modulo operation in an NR system having various subcarrier spacings.

Furthermore, this specification has an effect that it can improve performance for CSI acquisition or beam management by identically applying a (CSI-RS-related) sequence to ports within a code division multiplexing (CDM) group.

Effects which may be obtained in the present invention are not limited to the aforementioned effects, and other technical effects not described above may be evidently understood by a person having ordinary skill in the art to which the present invention pertains from the following description.

What is claimed is:

1. A method of determining, by a base station, an initialization value of a sequence in a wireless communication system, the method comprising:
   generating a sequence of a channel state information-reference signal (CSI-RS) based on a pseudo-random sequence; and
   transmitting, to a user equipment (UE), the sequence on resource elements (REs),
   wherein an initialization value of the pseudo-random sequence is determined by:

$c_{init}=(2^{10}\times((14n_s+l+1)(2N_{ID}+1))+N_{ID})\bmod 2^{31}+1$ wherein $n_s$ indicates a slot number within a radio frame, wherein $l$ is an OFDM symbol number within a slot, and wherein $N_{ID}$ is a scrambling identifier (ID).

2. The method of claim 1, wherein the scrambling ID has a value that is greater than or equal to 0 and that is less than or equal to $2^M-1$.

3. The method of claim 1, wherein the initialization value of the pseudo-random sequence has a different value for different OFDM symbols within a radio frame.

4. The method of claim 1, wherein the REs on which the sequence of the CSI-RS is transmitted comprise at least one of a time resource, a frequency resource, or an antenna port.

5. The method of claim 1, wherein the REs on which the sequence of the CSI-RS is transmitted comprise at least one code division multiplexing (CDM) group.

6. The method of claim 5, wherein antenna ports within one CDM group use a same sequence for the CSI-RS, and wherein antenna ports between different CDM groups use different sequences for the CSI-RS.

7. The method of claim 1, further comprising mapping the generated sequence to the REs, and
   wherein transmitting the sequence on the REs comprises transmitting the sequence that is mapped to the REs.

8. The method of claim 1, wherein the scrambling ID is a cell ID.

9. A base station configured to determine an initialization value of a sequence in a wireless communication system, the base station comprising:
   a radio frequency (RF) module;
   at least one processor; and
   at least one computer memory operably connectable to the at least one processor and storing instructions that, when executed by the at least one processor, perform operations comprising:
   generating a sequence of a channel state information-reference signal (CSI-RS) based on a pseudo-random sequence; and
   transmitting, to a user equipment (UE), the sequence on resource elements (REs),
   wherein an initialization value of the pseudo-random sequence is determined by:

$c_{init}=(2^{10}\times((14n_s+l+1)(2N_{ID}+1))+N_{ID})\bmod 2^{31}+1$ wherein $n_s$ indicates a slot number within a radio frame, wherein $l$ is an OFDM symbol number within a slot, and wherein $N_{ID}$ is a scrambling identifier (ID).

10. The base station of claim 9, wherein the operations further comprise mapping the generated sequence to the REs, and
    wherein transmitting the sequence on the REs comprises transmitting the sequence that is mapped to the REs.

11. The base station of claim 9, wherein the scrambling ID is a cell ID.

12. A user equipment (UE) configured to receive a channel state information-reference signal (CSI-RS) in a wireless communication system, the UE comprising:
    a radio frequency (RF) module;
    at least one processor; and
    at least one computer memory operably connectable to the at least one processor and storing instructions that, when executed by the at least one processor, perform operations comprising:
    receiving the CSI-RS from a base station;
    performing a measurement based on the CSI-RS; and
    reporting, to the base station, information regarding the measurement,
    wherein a sequence of the CSI-RS is generated based on a pseudo-random sequence,
    wherein an initialization value of the pseudo-random sequence is determined by:

$c_{init}=(2^{10}\times((14n_s+l+1)(2N_{ID}+1))+N_{ID})\bmod 2^{31}+1$ wherein $n_s$ indicates a slot number within a radio frame, wherein $l$ is an OFDM symbol number within a slot, and wherein $N_{ID}$ is a scrambling identifier (ID).

13. The UE of claim 12, wherein the scrambling ID has a value that is greater than or equal to 0 and that is less than or equal to $2^M-1$.

14. The UE of claim 12, wherein the initialization value of the pseudo-random sequence has a different value for different OFDM symbols within a radio frame.

15. The UE of claim 12, wherein the scrambling ID is a cell ID.

* * * * *